Nov. 20, 1962  A. Y. OVERMAN  3,065,293
EXPANSION JOINT FOR BUS BARS
Filed May 12, 1961
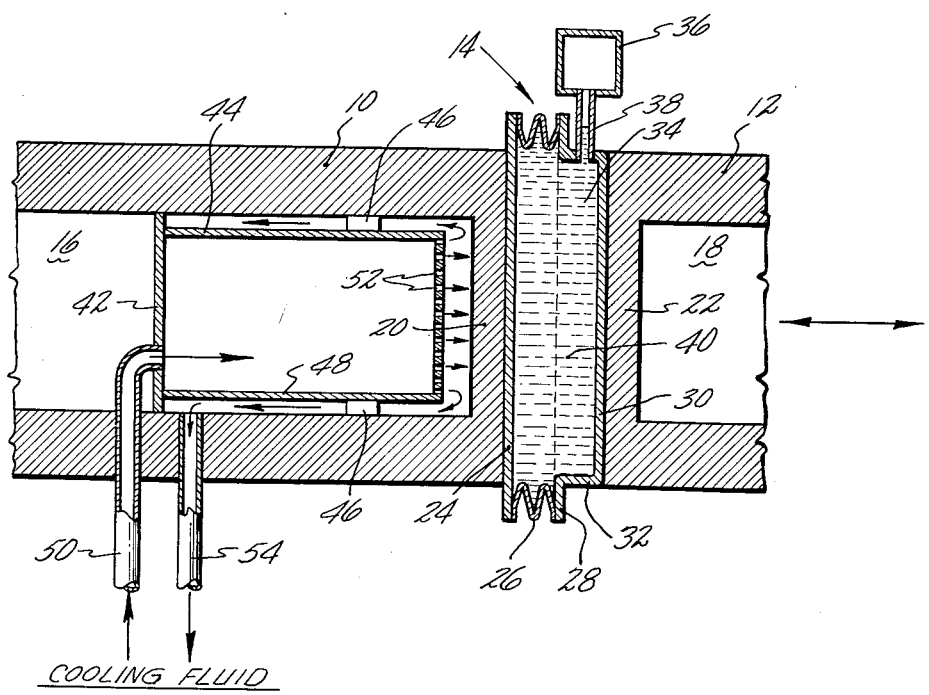
INVENTOR
AUBREY Y. OVERMAN
BY M. B. Tasker
ATTORNEY

United States Patent Office 3,065,293
Patented Nov. 20, 1962

3,065,293
EXPANSION JOINT FOR BUS BARS
Aubrey Y. Overman, South Glastonbury, Conn., assignor to United Aircraft Corporation, East Hartford, Conn., a corporation of Delaware
Filed May 12, 1961, Ser. No. 109,693
5 Claims. (Cl. 174—88)

This invention relates to heavy-duty electrical bus bars in which the thermal expansion of either the bus bar or the machine to which it is attached makes it impossible to take care of the expansion and contraction in either one or both of them. By heavy-duty is meant a bus bar which conducts heavy current and as a result has a high temperature rise.

It is an object of this invention to provide a bus bar construction which allows for high linear expansion or angular deflection of a heated bus bar with minimum penalty in conductivity.

Another object of the invention is to provide a heavy-duty bus bar having cooling means located adjacent a locality of high resistance.

A further object of the invention is to provide a sectional bus bar having an expansible chamber between adjacent sections which contains a body of liquid metal.

These and other objects and advantages of the invention will be evident or will be pointed out in connection with the following detailed description of a preferred embodiment of the invention shown in the accompanying drawing.

In this drawing, the single FIGURE shows a heavy-duty bus bar having the expansion device of this invention, together with the cooling means for protecting the expansion device from overheating.

As herein shown, the longitudinal bus bar includes two sections 10 and 12 connected by an expansion device generally indicated at 14. The sections 10 and 12 are shown as hollow conducting members providing axial chambers 16 and 18 although, obviously, they could comprise a plurality of spaced bars, if desired. The adjacent ends of the bus bar sections 10 and 12 are closed by end walls 20 and 22, which are spaced apart to receive the expansion device 14 therebetween.

The device 14 includes an end plate 24 which is attached to the end wall 20 of section 10. This attachment may be made by brazing. The plate 24 is preferably circular and has one end of a bellows 26 secured thereto by brazing. The other end of bellows 26 is brazed to an annular flange 28 of a second end plate 30, which has a short cylindrical portion 32 forming an annular chamber 34 at one side of the bellows chamber. Plate 30 is also secured by brazing to the end wall 22 of the bus bar section 12. An expansion tank 36 is provided above the bus bar which communicates through a pipe 38 with the cylindrical chamber 34. This tank may be vented, but as herein shown, is closed.

In securing plates 24 and 30 to the bus bar end wall 20 and 22, it is important that these plates be bonded to the bus bar sections over the entire face area in order to provide maximum conductivity between the bus bar section.

A body of liquid metal 40 is provided in the expansion device 14 which normally completely fills the bellows chamber and the cylindrical chamber 34. This may be mercury or any other suitable liquid having high-electrical conductivity. The plates 24 and 30, as well as the bellows 26, are made of a metal compatible with the liquid metal used.

Cooling means is provided adjacent the expansion device 14, herein in the chamber 16 of bus bar section 10. Dividing wall 42 is provided in chamber 16 which forms one end of a tank 44. The tank is supported by wall 42 and by a plurality of peripheral spacers 46, which are secured to the side wall 48 of the tank and also to the bus section 10. Cooling fluid is introduced to the interior of the tank through a pipe 50 and is discharged through a plurality of openings 52 in the end wall of the tank so that the cooling streams passing through the openings 52 are directed against the end wall 20 of the bus bar section. The cooling fluid then flows around the exterior of the tank and is discharged through a pipe 54. A similar cooling device may be provided in the bus bar section 12, if desired.

In operation, current flowing through the bus bar section 10 into section 12 has a complete metallic path of low resistance due to the presence of the liquid-metal-filled expansion device 14. As the bus bar temperature rises, any expansion of the bus bar sections is taken up in the expansion joint 14, the liquid metal therein being forced upwardly through the pipe 38 into the expansion tank 36. The tank may be filled with an inert gas and is large enough to take up the changes in volume of the expansible device 14 without excessive pressure. The joint 14 also compensates for any variation in angularity of the bus bar sections during expansion and contraction of the latter.

As a result of the above-described construction, it will be evident that a bus bar structure has been provided which can operate with a very high temperature rise without difficulty due to the flexibility of the joint 14, which is capable of absorbing any axial variation in the length of the bus bar sections.

It will also be evident that the expansion joint 14 introduces very little electrical resistance into the bus bar due to the presence of the liquid metal therein. Also, the cooling device provided will easily control the temperature rise in the expansible joint and its vicinity.

While only one embodiment of the invention has been shown herein, it will be evident that various changes in the construction and arrangement of the parts may be resorted to without departing from the scope of the invention.

I claim:

1. A bus bar structure including two current conductors arranged end-to-end, and means electrically connecting the adjacent ends of said conductors comprising an electrically conducting expansion joint, said joint including two parallel end walls, one of which is secured in good electrically conducting relation to an end of each conductor, an intermediate annular bellows connecting said end walls forming an axially expansible chamber, a body of electrically conducting liquid metal in said chamber, and an expansion tank in communication with said chamber.

2. A bus bar structure including two hollow current conductors arranged end-to-end and having their adjacent ends closed, and means electrically connecting said closed ends comprising an expansion joint, said joint including two annular end plates, each connected to a closed end of a different conductor, and an intermediate bellows connected to said end plates at its extremities forming an axially expansible and contractible chamber, a body of liquid metal in said chamber, a wall spaced from the closed end of one of said conductors forming a cooling chamber, and means for circulating a cooling fluid in said cooling chamber.

3. A bus bar structure including two hollow current conductors arranged end-to-end and having their adjacent ends closed, and means electrically connecting said closed ends comprising an expansion joint, said joint including two annular end plates, each connected to a closed end of a different conductor, and an intermediate bellows connected to said end plates at its extremities forming an axially expansible and contractible chamber, a body of liquid metal in said chamber, a wall spaced from the closed end of one of said conductors forming a cooling chamber, means for circulating a cooling fluid in said cooling chamber, and means in said cooling chamber for directing said cooling fluid against the closed end of said conductor.

4. An expansion joint for electrical bus bars comprising a metallic bellows, an end plate forming a closure for one end of said bellows, an annular cup-shaped member having an outstanding annular lip which is secured to the other end of said bellows, a body of liquid metal in said bellows and said adjacent cup-shaped member, and an expansion tank having fluid communication with the interior of said cup-shaped member.

5. An expansion joint for electrical bus bars comprising a metallic bellows, end plates secured to the opposite ends of said bellows to which adjacent sections of a bus bar are adapted to be connected, a body of liquid metal contained in said bellows, and a fluid reservoir having fluid communication with the interior of said bellows for accommodating said liquid metal upon linear expansion of said bus bar sections.

References Cited in the file of this patent

UNITED STATES PATENTS 2,424,545 Bard July 29, 1947